(12) United States Patent
Lavigne et al.

(10) Patent No.: US 7,009,989 B2
(45) Date of Patent: Mar. 7, 2006

(54) FORWARDING ORDERED DATA PACKETS WITH LESS DELAY

(75) Inventors: Bruce E. Lavigne, Roseville, CA (US); Lewis S. Kootstra, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 858 days.

(21) Appl. No.: 10/091,874

(22) Filed: Mar. 5, 2002

(65) Prior Publication Data

US 2003/0169739 A1    Sep. 11, 2003

(51) Int. Cl.
*H04L 12/28*        (2006.01)

(52) U.S. Cl. ...................................... 370/413; 370/401
(58) Field of Classification Search ................ None
See application file for complete search history.

(56) References Cited

U.S. PATENT DOCUMENTS

| 5,768,257 | A | * | 6/1998 | Khacherian et al. | 370/229 |
| 5,844,905 | A | * | 12/1998 | McKay et al. | 370/443 |
| 6,246,684 | B1 | * | 6/2001 | Chapman et al. | 370/394 |
| 2003/0108056 | A1 | * | 6/2003 | Sindhu et al. | 370/401 |
| 2003/0169758 | A1 | * | 9/2003 | Lavigne et al. | 370/428 |

* cited by examiner

*Primary Examiner*—Duc Ho

(57) ABSTRACT

A method and system thereof for forwarding data packets according to an order of forwarding while lessening delays. A resource request corresponding to a first data packet that is first according to the order is generated. A first resource request corresponding to a second data packet that follows the first data packet according to the order is generated. Generation of a subsequent resource request for the second data packet is delayed for a specified time period. A second resource request for the second data packet is generated before the specified time period is due to expire when the first data packet is forwarded. In this manner, a delay attributable to the specified time period is lessened.

21 Claims, 6 Drawing Sheets

FORWARDING ORDERED DATA PACKETS WITH LESS DELAY

TECHNICAL FIELD

Embodiments of the present invention relate to networking. More particularly, embodiments of the present invention relate to a system and method for forwarding ordered data packets with less delay.

BACKGROUND ART

The Internet has revolutionized the movement of information. Routers or switches are typically used to direct traffic through networks or network segments. A principal function of a router or a switch is to move information, usually in the form of data packets, particularly Internet Protocol (IP) packets, from one network or network segment to another. Another function of a router or switch is to control the rate of flow of the information.

Receiving data packets, holding them in a queue (e.g., in an inbound buffer), and sending them out when a receiving buffer (e.g., an outbound buffer) is capable of accommodating such packets, is one method of managing the flow of information. A sending function will make a resource request (e.g., a buffer request), seeking an allocation of space in the outbound buffer for a data packet. A receiving function will respond to the buffer request. The response (e.g., a buffer reply), in general, will either indicate that the outbound buffer is able to receive the data packet, or will indicate that the outbound buffer cannot receive the data packet at this time, but may be able to at some later time. Other types of responses may be made, but these other types of responses are not necessarily relevant to the current discussion. Depending on the form of the buffer reply, the sending function either transfers the packet to the outbound memory or sends another buffer request at a later time.

For reasons known in the art, it is important to ensure that data packets are forwarded in a particular order, typically the order in which they are received. For example, many types of multi-part messages, such as streamed media data, may be degraded if their original packet order is not maintained. Thus, forwarding data packets in order is considered a key attribute for switches and routers.

Prior Art FIG. 1 illustrates data packets 1, 2, 3, 4, . . . , N queued in an inbound buffer 10 under control of some type of sending function (e.g., packet processor 20). Here, the data packets are stored according to the order in which they are to be forwarded; thus, data packet 1 should be forwarded before data packet 2, and so on.

According to the prior art, for data packet 1, packet processor 20 issues a buffer request to a receiving function that controls an outbound buffer (note that the receiving function can be performed by packet processor 20, or by another packet processor coupled to packet processor 20 by the network fabric). Generally speaking, if and when the outbound buffer is ready to receive data packet 1, the receiving function will respond with a buffer reply. After data packet 1 is sent, the process is repeated for data packet 2, and so on.

The prior art approach has the desired effect of ensuring that data packets are forwarded in the proper order, but at a loss of speed and efficiency. That is, while data packet 2 cannot be sent until after data packet 1 is sent, processing of data packet 2 is delayed until the processing of data packet 1 is completed.

Thus, the prior art is problematic because, even though data packet 2 may be ready to be sent, or even though an outbound buffer is ready to receive data packet 2, the data packet cannot be processed until data packet 1 is sent. This has the effect of reducing the rate at which data packets can be processed and decreasing the bandwidth of the router or switch. Accordingly, what is needed is a method and/or system that can increase data packet throughput in a router, switch or similar network device. The present invention provides a novel solution to this need.

SUMMARY OF THE INVENTION

A method and system thereof for forwarding data packets according to an order of forwarding while lessening delays is described. A resource request corresponding to a first data packet that is first according to the order is generated. A first resource request corresponding to a second data packet that follows the first data packet according to the order is generated. Generation of a subsequent resource request for the second data packet is delayed for a specified time period. A second resource request for the second data packet is generated before the specified time period is due to expire when the first data packet is forwarded. In this manner, a delay attributable to the specified time period is lessened.

BRIEF DESCRIPTION OF THE DRAWINGS

The accompanying drawings, which are incorporated in and form a part of this specification, illustrate embodiments of the present invention and, together with the description, serve to explain the principles of the invention.

PRIOR ART

BEST MODE FOR CARRYING OUT THE INVENTION

Embodiments of the present invention pertain to a method and apparatus for forwarding ordered data packets with reduced delays. In one embodiment, the data packets are queued in a particular order corresponding to the order in which they are to be forwarded. A resource request is generated on behalf of a data packet that is at the head of the queue. A resource request is also generated on behalf of a data packet that is second in the queue. Resource requests can be also generated for other data packets lower in the queue. Data packets that are not at the head of the queue may be directed to delay subsequent resource requests for a specified period of time (a wait period). As each of these data packets reach the head of the queue, they are allowed to generate a resource request even if the wait period has not timed out. Thus, any latency attributable to the wait period is removed, allowing data packets to be processed sooner and improving overall system performance.

Embodiments of the present invention can be implemented on network devices such as routers and switches. Network routers or switches utilizing embodiments of the present invention may process greater numbers of data packets in a given time, improving device and hence network throughput as measured both in packets per second and in elapsed switching time per packet. Importantly, the increase in bandwidth is achieved while maintaining packet ordering.

Figure 1:
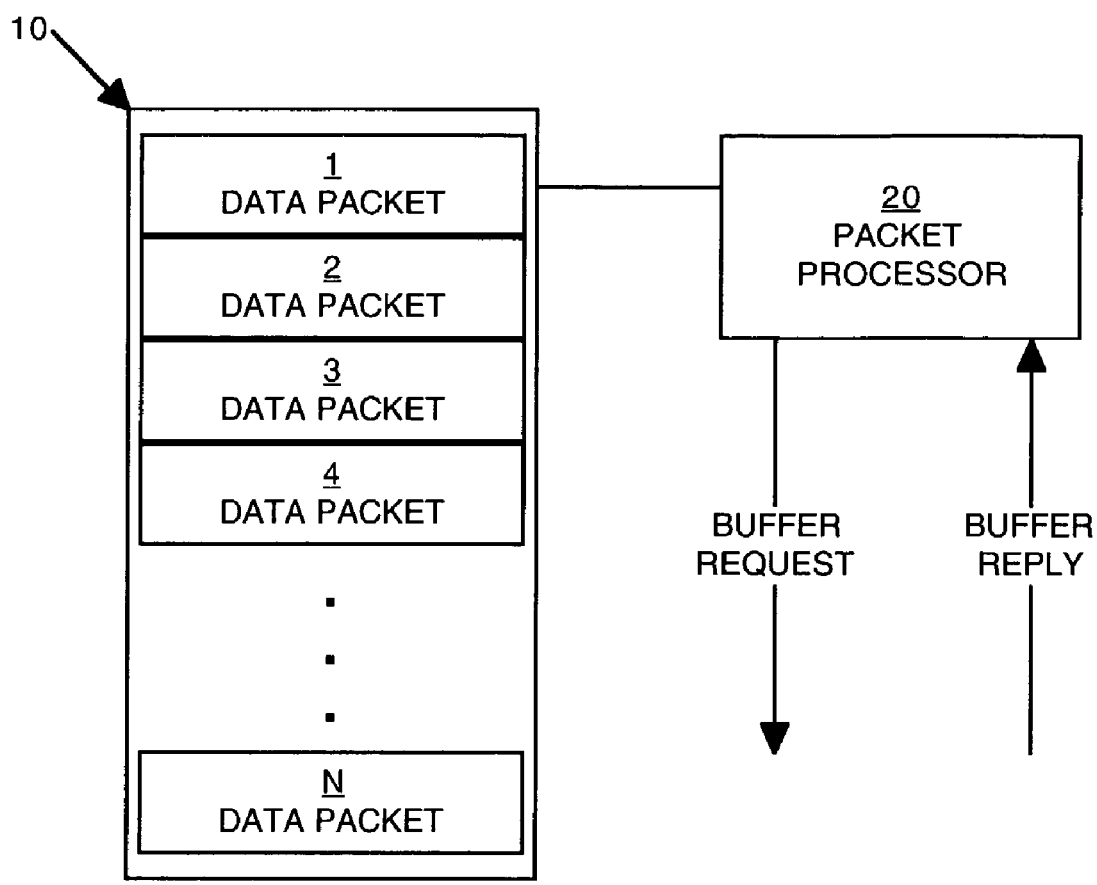
FIG. 1 illustrates data packets in a queue according to a prior art method for forwarding ordered data packets.
Figure 2:
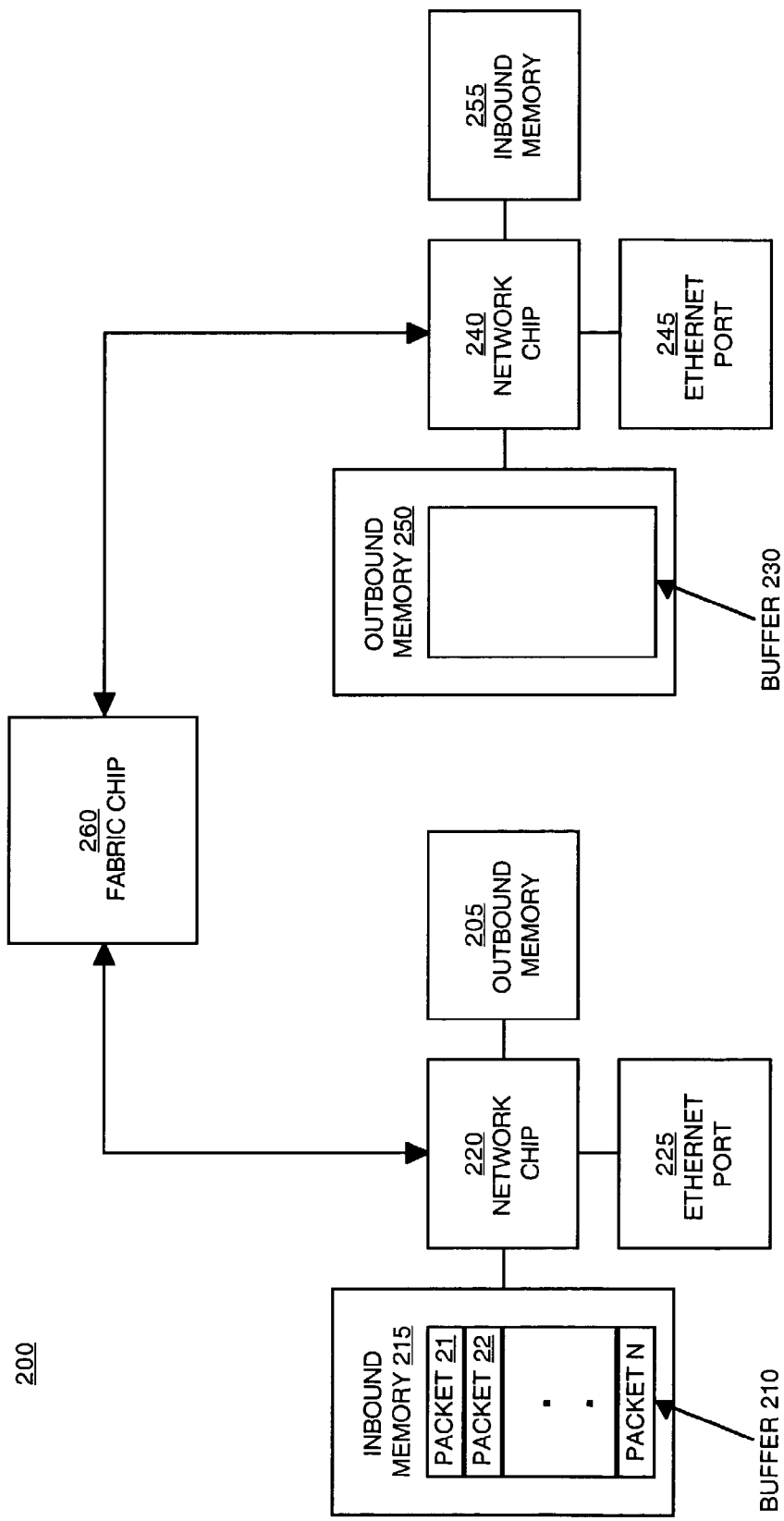
FIG. 2 is a block diagram of one embodiment of a network architecture for forwarding ordered data packets according to embodiments of the present invention.

FIG. 2 is a block diagram of one embodiment of a network architecture 200 for forwarding ordered data packets 21, 22, . . . , N upon which embodiments of the present invention may be implemented. In the embodiment of FIG. 2, network architecture 200 includes two network chips 220 and 240 coupled via a fabric chip 260. In the present embodiment, fabric chip 260 functions essentially as a crossbar. Network chip 220 is coupled to and provides the controlling logic for inbound memory 215, outbound memory 205, and Ethernet port 225. Network chip 240 is coupled to and provides the controlling logic for inbound memory 255, outbound memory 250, and Ethernet port 245. The outbound memories store (buffer) data packets for their respective ports; for example, data packets to be forwarded via Ethernet port 245 are buffered by outbound memory 250 in buffer 230.

It is appreciated that the present invention, in its various embodiments, is not limited to implementation on network architecture 200, and that a network architecture implementing the features of the present invention may include other elements not shown by FIG. 2. It is also appreciated that embodiments of the present invention may be practiced in a network architecture that includes multiples of some or all of the elements shown in FIG. 2. For example, a contemporary network architecture may utilize up to eight network chips, with each network chip associated with up to eight Ethernet ports; however, the present invention is not limited to such an architecture. It is further appreciated that, although certain elements are shown as separate entities in FIG. 2, some or all of these elements may be integrated into a unit that provides the functionality of the combined elements. In general, embodiments of the present invention may be practiced on a network architecture that provides functionality similar to that provided by network architecture 200.

In the present embodiment, inbound memory 215 is shown as including a buffer 210 for storing data packets 21, 22, . . . , N. Note that the destinations of data packets in buffer 210 may be different. Distributed memory systems may also be used to store the data packets, such that the data packets do not all reside in the same buffer.

In this embodiment, the data packets 21, 22, . . . , N are stored in buffer 210 according to the order in which they are to be forwarded (routed, switched) to their destination(s); generally, this also corresponds to the order in which the data packets were received. Thus, data packet 21 is to be forwarded to its destination first, then data packet 22, and so on. It is appreciated that other approaches can be used to enforce the order in which the data packets are to be forwarded. In general, embodiments of the present invention are well suited for use in network architectures in which it is desirable to forward data packets in a particular order. In fact, the present invention enhances this capability, as will be seen.

In the context of network architecture 200, the typical path of a data packet (e.g., data packet 21) is described as follows. The typical data path is described for network chip 220 and its elements (inbound memory 215, outbound memory 215, and Ethernet port 225); it is understood that the other elements of network architecture 200 function in a similar manner.

In the present embodiment, data packet 21 is received by network chip 220 via Ethernet port 225 and placed in inbound memory 215. As described above, in one embodiment, data packet 21 is placed in a queue in buffer 210; when data packet 21 arrives, it is placed at the end of the queue, and as preceding data packets are sent, the data packet advances until it is at the head of the queue, which is the case shown in FIG. 2.

According to the present embodiment, network chip 220 (specifically, a fabric receiver module implemented by network chip 220) receives requests for data packets stored in buffer 210, determines which of its ports are to receive data packets, and determines which of its ports have available resources. That is, for example, network chip 220 determines whether outbound memory 205 has resources available to buffer a data packet destined for Ethernet port 225. Similarly, network chip 240 manages outbound memory 255 on behalf of Ethernet port 245.

If data packet 21 is to be routed (switched) to Ethernet port 225, network chip 220 will determine whether there is room for data packet 21 in outbound memory 205. Generally speaking, when there is room, data packet 21 will be forwarded to outbound memory 205 and subsequently sent to its next destination via Ethernet port 225. If there is not room, data packet 21 will remain in buffer 210 until there is room in outbound memory 205.

If data packet 21 is to be routed (switched) to Ethernet port 245, it will be sent once network chip 220 receives a message from network chip 240 indicating that there is room in outbound memory 250 (buffer 230) to store data packet 21. As described in more detail below, the message may indicate that the data packet can be sent immediately or after some period of time. Upon receiving such a message, data packet is forwarded to outbound memory 250 and subsequently to its next destination via Ethernet port 245. Otherwise, data packet 21 remains in buffer 210 until there is room in outbound memory 250.

Figure 3:
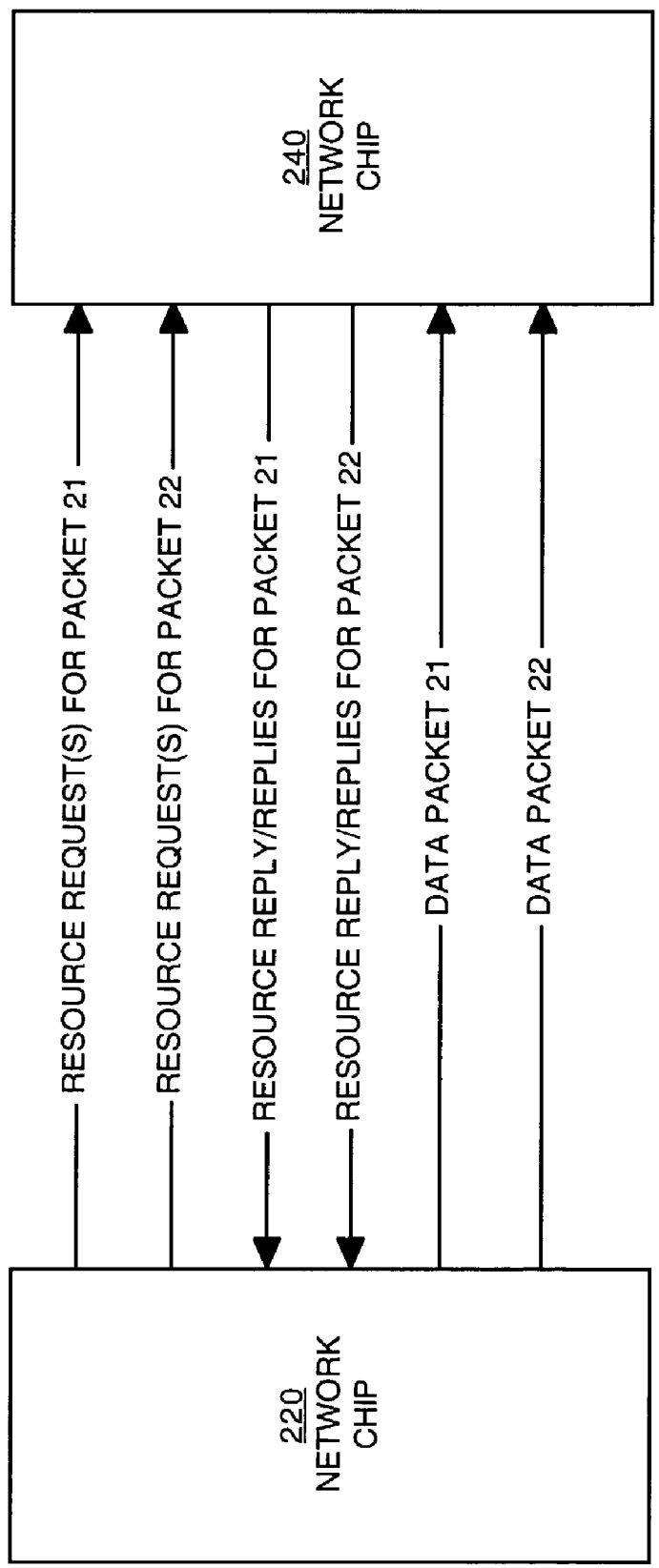
FIG. 3 illustrates the flow of data between elements of a network architecture according to one embodiment of the present invention.

FIG. 3 illustrates the flow of data between elements of a network architecture according to one embodiment of the present invention. In this embodiment, requests, replies and data packets are shown as flowing between network chip 220 and network chip 240. It is appreciated that this information is in actuality exchanged via fabric chip 260 as illustrated in FIG. 2; for simplicity of illustration, fabric chip 260 is not shown in FIG. 3. Furthermore, it is appreciated that data in an inbound memory associated with one of the network chips will not necessarily be sent to an outbound memory (and Ethernet port) associated with a different network chip. That is, with reference also to FIG. 2, data in inbound memory 215 can be forwarded to outbound memory 205 (Ethernet port 225) or to outbound memory 250 (Ethernet port 245). However, for simplicity of discussion, it will be assumed that data packets 21 and 22 are both to be routed (switched) to Ethernet port 245.

As described above, data packet 21 is to be sent first, then data packet 22. To ensure that data packets are sent in their proper order, data packets that are lower in the queue cannot be forwarded until the data packet at the head of the queue is forwarded. The data packet at the head of the queue is referred to herein as being in active mode, while the other data packets are referred to as being queued. Thus, only an active data packet can be sent, and queued data packets cannot be sent until the active data packet has been sent.

In the present embodiment, referring to both FIGS. 2 and 3, a fabric driver module in network chip 220 determines where to send data packet 21 and drives a resource request (e.g., a buffer request) on behalf of data packet 21. For example, if data 21 packet is to be switched (routed) to Ethernet port 245, then network chip 220 generates and sends to network chip 240 a buffer request corresponding to data packet 21. In essence, a buffer request is a request for an allocation of space in a receiving buffer (e.g., buffer 230). In general, a buffer request elicits a resource reply (e.g., a buffer reply); thus, for data packet 21, network chip 240 sends a buffer reply to network chip 220 in response to a buffer request received from network chip 220.

A buffer reply may take different forms. For simplicity of discussion, consideration is given herein to buffer replies that, in general, indicate that the outbound buffer (e.g., buffer 230) is able to receive data packet 21, either immediately or after a period of time (referred to herein as a wait period). In the former case, there is no wait period (delay) specified, active data packets may be sent immediately, and queued data packets can be sent as soon as they become active; these type of buffer replies can be referred to as "ACKs." In the latter case, in one embodiment, the buffer reply specifies the length of the wait period; these type of buffer replies can be referred to as "NACKs." Alternatively, the wait period may be a default length of time that has been specified in advance and is invoked automatically when the buffer reply is a NACK (for example, a status field in the buffer reply can be used to identify the buffer reply as a NACK). NACKs are used to prevent buffer request/reply storms that could tax the network fabric. A data packet subject to a wait period can be referred to as being in a wait state.

According to the present embodiment, after sending the buffer request for data packet 21, network chip 220 then sends to network chip 240 a buffer request corresponding to data packet 22. Importantly, this buffer request is sent before data packet 21 has been forwarded from buffer 210. Thus, in accordance with the present embodiment of the present invention, although data packet 22 is not active, resources can be requested on its behalf in anticipation of it becoming active. It is appreciated that buffer requests can also be issued for other data packets lower in the queue than data packets 21 and 22. When a buffer request is issued for a queued data packet, that data packet is referred to herein as being in speculative mode.

Typically, some amount of time will pass between the sending of a buffer request and the receipt of a corresponding buffer reply (referred to herein as a latency period). In the present embodiment, buffer requests for queued data packets can be sent prior to the receipt of a buffer reply for data packet 21; that is, buffer request for queued data packets can be sent during the latency period between the buffer request for data packet 21 and the corresponding buffer reply. Should there be a latency period between the buffer reply for data packet 21 and the time that data packet 21 is sent, buffer requests for queued data packets can be issued during that latency period as well. Thus, in the present embodiment, the present invention is able to advantageously utilize latency periods to improve throughput.

Continuing with reference to FIG. 3, when a positive resource reply (e.g., an ACK buffer reply) is received by network chip 220 for data packet 21, that data packet can be immediately forwarded to network chip 240 (specifically, outbound memory 230 of FIG. 2). When a negative resource reply (e.g., a NACK buffer reply) is received for data packet 21, another resource request may need to be made on behalf of data packet 21; when a corresponding positive resource reply (e.g., an ACK buffer reply) received, data packet 21 can then be sent. When data packet 21 is sent, data packet 22 becomes active.

As described above, a buffer request can be generated for a queued data packet (e.g., data packet 22) before it becomes active; when the buffer request is generated, the queued data packet enters the speculative state. The buffer reply for a speculative data packet may be an ACK or a NACK. If the buffer reply is an ACK, then data packet 22 can be sent as soon as it becomes active. If the buffer reply is a NACK, a wait period is imposed on data packet 22. In one embodiment, the wait period specified for a speculative data packet may be longer than the wait period specified for an active data packet.

During the wait period, a second buffer request for data packet 22 (subsequent to the first buffer request) cannot be generated as long as data packet 22 is not active. In the present embodiment, should data packet 22 transition to the active state, the wait period is disregarded and a second buffer request for data packet 22 can be issued. This approach is similarly applied to the other speculative data packets.

Figures 4A, 4B:
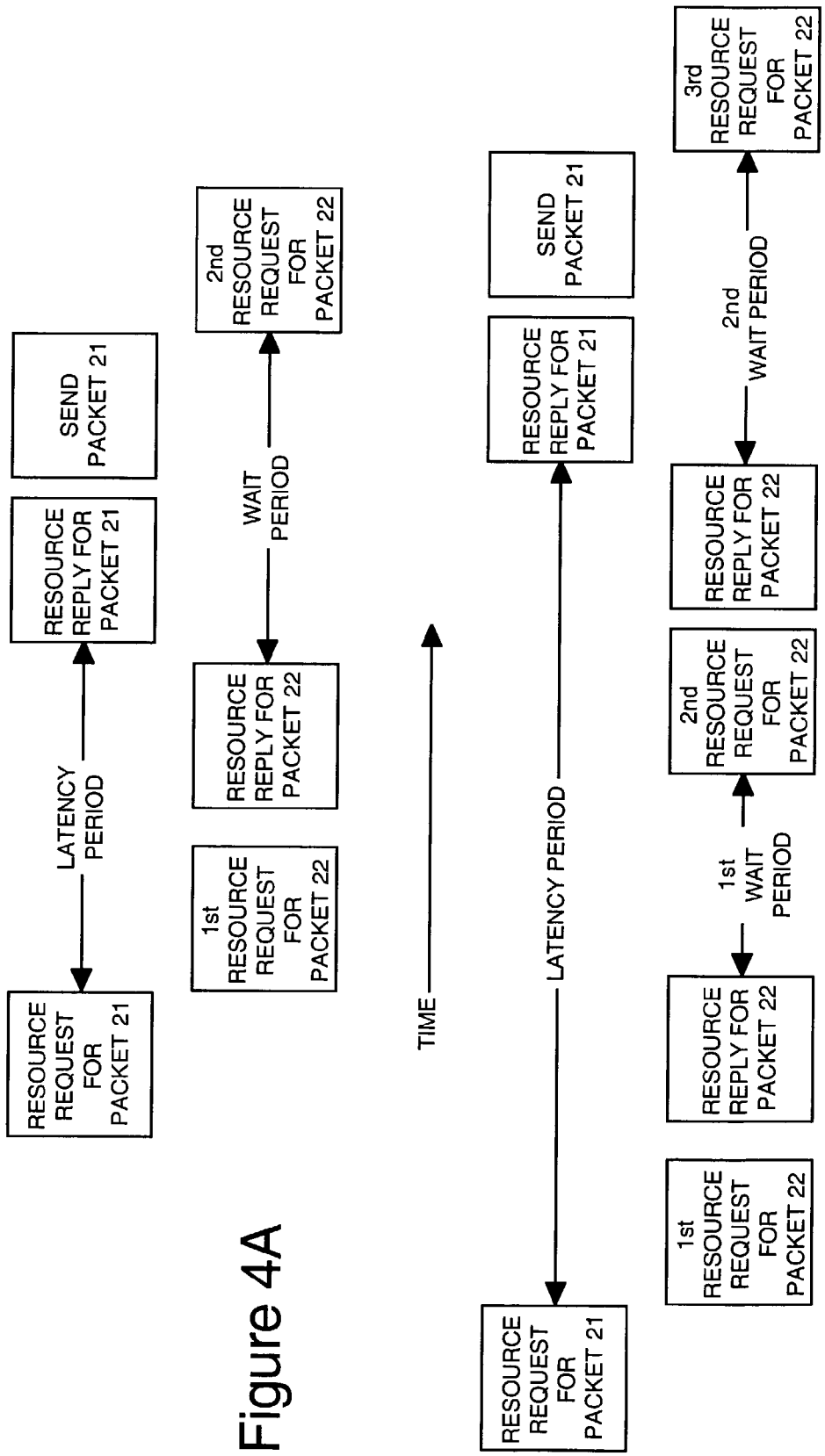
FIGS. 4A and 4B are timelines illustrating the processing of data packets according to embodiments of the present invention.

FIGS. 4A and 4B are timelines illustrating the processing of data packets according to embodiments of the present invention. The timelines of FIGS. 4A and 4B are meant to illustrate the relative sequence of events and are not to scale.

Referring first to FIG. 4A, a resource request for packet 21 is generated. During the latency period before a corresponding resource reply for packet 21 is received, a first resource request is generated for data packet 22, and a corresponding resource reply for data packet 22 is received. If the resource reply for data packet 22 is negative (a NACK), a wait period for data packet 22 is initiated; during the wait period, a subsequent resource request for data packet 22 cannot be generated. The resource reply for data packet 22 may also be an ACK; however, data packet 22 cannot be sent until it enters the active state.

Next, in the example of FIG. 4A, a positive resource reply (an ACK) for data packet 21 is received and data packet 21 is then forwarded. It is appreciated that other events may need to occur before data packet 21 is forwarded, depending for example on whether the resource reply for data packet 21 is instead a NACK. In the latter case, a second resource request may need to be generated for data packet 21, and a corresponding resource reply received. It is also appreciated that there may a period of latency before data packet 21 is sent.

With regard to the present embodiment of the present invention, of significance is what occurs after data packet 21 is sent. According to the present embodiment, after data packet 21 is sent, data packet 22 transitions to the head of the queue. If data packet 22 was not in a wait state, then data packet 22 can be sent immediately. If data packet 22 was in a wait state, a second resource request is generated for data packet 22 without delay, whether or not the specified wait period has expired. This can be accomplished in any of a variety of ways. For example, the wait period can be truncated, the wait period can be set to zero, or the wait period can be disregarded. In general, for a data packet in the wait state, upon the transition of the data packet to the active mode, a new resource request is generated for that data packet before the specified wait period is due to expire. Thus, when processing data packet 22, there is no delay attributable to the wait period, allowing data packet 22 to be quickly processed and thereby improving overall system performance.

Referring now to FIG. 4B, a resource request for data packet 21 is generated. In the example of FIG. 4B, during the following latency period, a first resource request is generated for data packet 22, and a corresponding negative resource reply (a NACK) is received, initiating a first wait period for data packet 22. In this case, the first wait period expires before data packet 21 has been sent, and therefore a second resource request for data packet 22 is generated. The corresponding resource reply for data packet 22 may also be a NACK, in which case a second wait period is initiated for data packet 22. In one embodiment, the second wait period is different from the first wait period. In particular, the second wait period may be longer than the first wait period.

In a manner similar to the above, once a positive resource reply (an ACK) for data packet 21 is received and data packet 21 is sent, data packet 22 will transition to the active state, triggering a third resource request for data packet 22 without delay (before the second wait period was due to expire).

According to the present embodiment, had the second wait period expired before data packet 21 was sent, a third wait period for data packet 22 can be set in the manner just described. In one embodiment, the third wait period is different from the second wait period, and in particular, may be longer than the second wait period.

Figure 5:
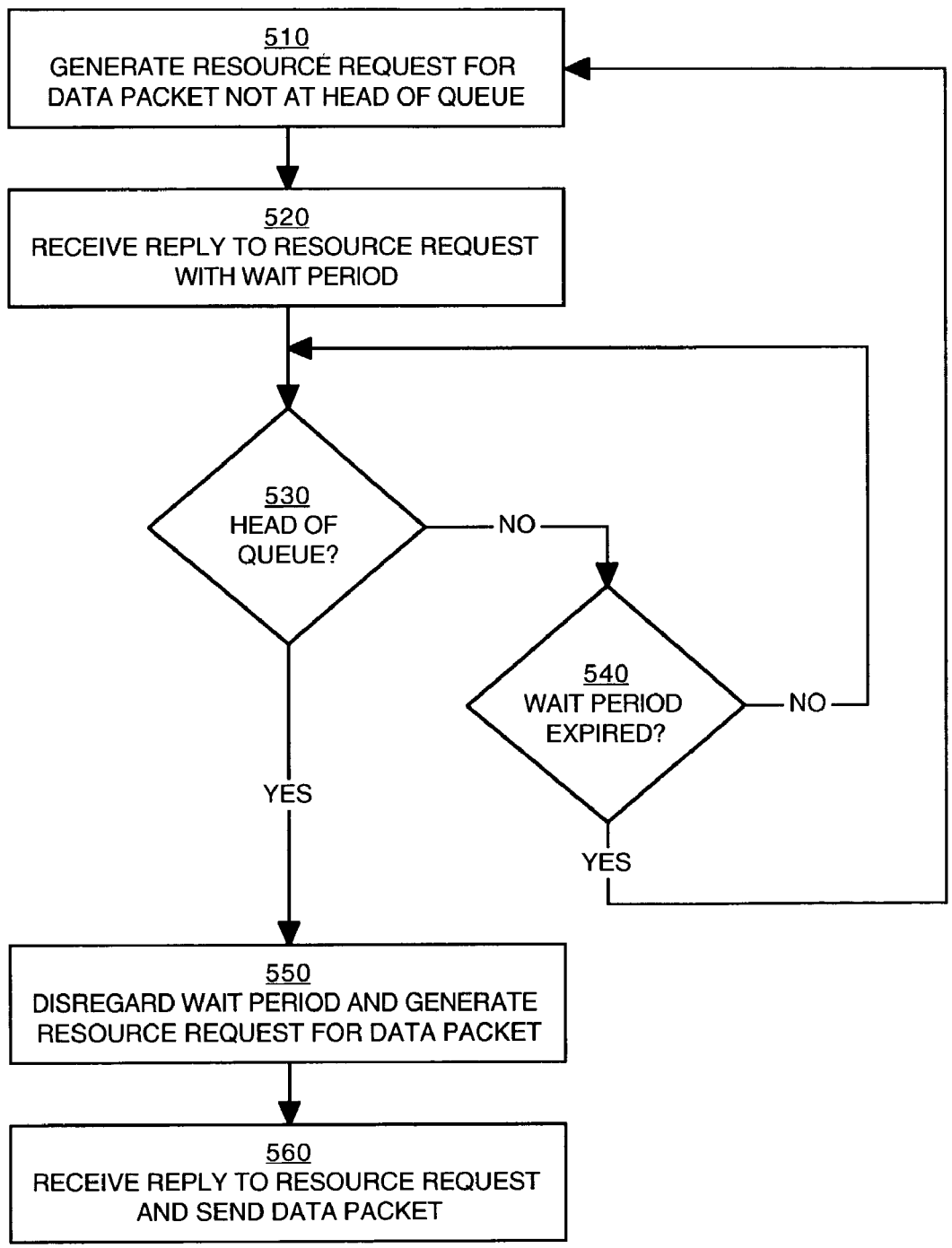
FIG. 5 is a flowchart of one embodiment of a method for processing a data packet in accordance with the present invention.

FIG. 5 is a flowchart 500 of one embodiment of a method for processing a data packet in accordance with the present invention. Flowchart 500 includes processes of the present invention that, in one embodiment, are carried out by a processor under the control of computer-readable and computer-executable instructions. In one embodiment, the processes of the present invention are implemented using an Application Specific Integrated Circuit (ASIC).

Although specific steps are disclosed in flowchart 500 of FIG. 5, such steps are exemplary. That is, the present invention is well suited to performing various other steps or variations of the steps recited in flowchart 500. It is appreciated that the steps in flowchart 500 may be performed in an order different than presented, and that not all of the steps in flowchart 500 may be performed.

The embodiment of the present invention described by flowchart 500 is directed to a queued data packet; that is, a data packet that is not first according to an order of forwarding. Although flowchart 500 is described for a single data packet, it is understood that, in one embodiment, the steps in flowchart 500 can be performed in parallel for multiple data packets, within the constraint that the queued data packets are forwarded according to the order of forwarding.

In step 510, in the present embodiment, a resource request (buffer request) is generated for the data packet. In one embodiment, the resource request for the queued data packet is made after a resource request for the data packet that is first according to the order of forwarding (e.g., the active data packet).

In step 520 of the present embodiment, a negative resource reply (a NACK) is received. In one embodiment, the negative resource reply includes a wait period of specified length. During this wait period, the queued (or speculative) data packet cannot generate a resource request, unless the data packet moves to the head of the queue.

In step 530, in the present embodiment, a determination is made with regard to whether the queued (speculative) data packet has transitioned to the head of the queue; that is, the active data packet as well as any other data packets ahead in the queue have been sent. If the data packet is not yet at the head of the queue, then flowchart 500 proceeds to step 540; otherwise, flowchart 500 proceeds to step 550.

In step 540, according to the present embodiment, a determination is made with regard to whether the specified wait period (from step 520) has expired. If not, flowchart 500 returns to step 530, and the queued data packet remains in the wait state. If so, and the queued data packet is not yet at the head of the queue, flowchart 500 returns to step 510.

In step 550 of the present embodiment, in which the data packet has reached the head of the queue, a resource request for the data packet is generated without delay, before the specified time period is due to expire. This can be implemented by reducing the wait period (specifically, to zero), by truncating any remaining time, or by disregarding the time remaining in the wait period. In one embodiment, the transition of the data packet to the active state from the speculative state automatically triggers the generation of the resource request.

In one embodiment, exemplary code for accomplishing this is provided by Table 1.

TABLE 1

Exemplary Code Used in Accordance with One Embodiment of the Present Invention

```
if (newly_active_fbs[brg_fb])
begin
    next_pend_chips =  reduce(req_fb_state, 'FBC_Pend)  |
                       reduce(req_fb_state, 'FBC_WAIT1) |
                       reduce(req_fb_state, 'FBC_WAIT2) |
                       reduce(req_fb_state, 'FBC_WAIT3);
end
else
begin
    next_pend_chips =  reduce(req_fb_state, 'FBC_Pend);
end
```

In step 560 of FIG. 5, in the present embodiment, when a positive reply (an ACK) is received to the resource request of step 550, the data packet can be sent to its destination.

Figure 6:
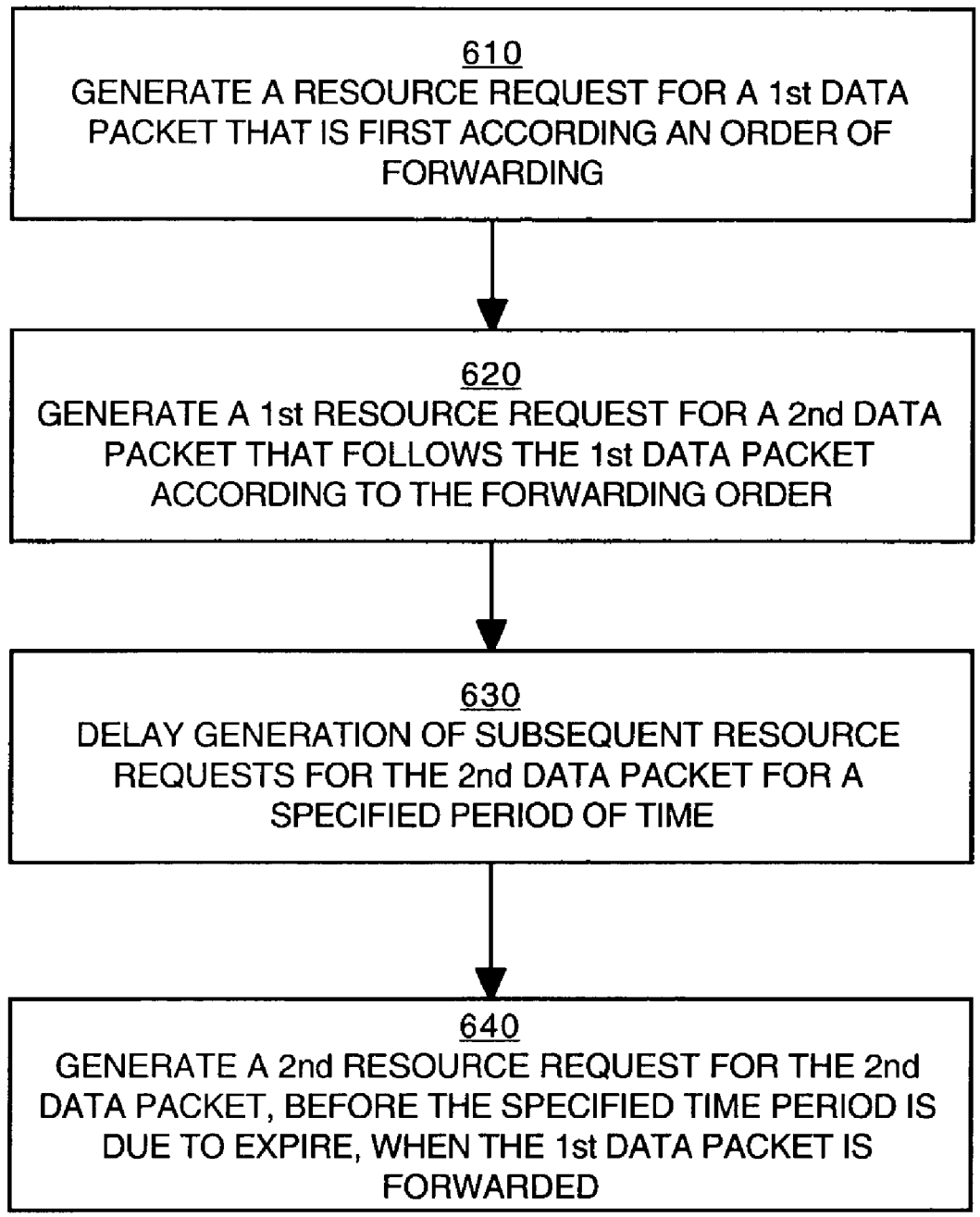
FIG. 6 is a flowchart of another embodiment of a method for processing a data packet in accordance with the present invention.

FIG. 6 is a flowchart 600 of another embodiment of a method for processing a data packet in accordance with the present invention. Flowchart 600 includes processes of the present invention that, in one embodiment, are carried out by a processor under the control of computer-readable and computer-executable instructions. In one embodiment, the processes of the present invention are implemented using an ASIC.

Although specific steps are disclosed in flowchart 600 of FIG. 6, such steps are exemplary. That is, the present invention is well suited to performing various other steps or variations of the steps recited in flowchart 600. It is appreciated that the steps in flowchart 600 may be performed in an order different than presented, and that not all of the steps in flowchart 600 may be performed.

In step 610, in the present embodiment, a resource request is generated for a first data packet that is first according to an order of forwarding. In one embodiment, the resource request is a buffer request.

In step 620, in the present embodiment, a first resource request (e.g., a buffer request) is generated for a second data packet that follows the first data packet according to the order of forwarding.

In step 630, in the present embodiment, generation of a subsequent resource request for the second data packet is delayed for a specified time period. In one embodiment, the specified time period is provided in a negative resource reply (a NACK) made to the resource request of step 620.

In step 640 of the present embodiment, a second resource request is made for the second data packet before the specified time period is due to expire, upon said data packet becoming first according to the order of forwarding (for example, when the first data packet is forwarded). In one embodiment, the specified time period is set to zero when the second data packet transitions to first in the order. In another embodiment, generation of the second resource request for the second data packet is triggered by the second data packet transitioning to first in the order.

The preferred embodiment of the present invention, forwarding ordered data packets with less delay, is thus described. While the present invention has been described in particular embodiments, it should be appreciated that the present invention should not be construed as limited by such embodiments, but rather construed according to the following claims.

What is claimed is:

1. A method of forwarding data packets according to an order of forwarding, comprising:
   generating a resource request corresponding to a first data packet that is first according to said order;
   generating a first resource request corresponding to a second data packet that follows said first data packet according to said order;
   delaying generation of a subsequent resource request for said second data packet for a specified time period; and
   generating a second resource request for said second data packet before said specified time period is due to expire when said first data packet is forwarded such that a delay attributable to said specified time period is lessened.

2. The method as recited in claim 1 wherein a resource request comprises a buffering request.

3. The method as recited in claim 1 comprising:
   setting said specified time period to zero when said first data packet is forwarded.

4. The method as recited in claim 1 wherein said data packets are queued in a buffer according to said order of forwarding.

5. The method as recited in claim 1 wherein said generating of said second resource request for said second data packet is triggered by said second data packet transitioning to first in said order.

6. The method as recited in claim 1 wherein said specified time period is provided in a reply to said first resource request for said second data packet.

7. The method as recited in claim 1 comprising:
   generating said second resource request for said second data packet upon expiration of said specified time period.

8. A method of forwarding data packets, comprising:
   maintaining said data packets in a queue according to an order in which said data packets will be forwarded;
   generating a first buffer request corresponding to a data packet not at the head of said queue;
   specifying a first wait period during which a subsequent buffer request for said data packet is not to be generated; and
   reducing said first wait period when said data packet transitions to the head of said queue.

9. The method as recited in claim 8 wherein said first wait period is reduced to zero when said data packet transitions to the head of said queue.

10. The method as recited in claim 8 comprising:
    generating a second buffer request for said data packet in response to said data packet transitioning to the head of said queue, wherein said second buffer request is generated before said first wait period is set to expire.

11. The method as recited in claim 8 comprising:
    generating a second buffer request for said data packet upon expiration of said first wait period.

12. The method as recited in claim 11 comprising:
    receiving a reply to said second buffer request, wherein a second wait period is specified in said reply.

13. The method as recited in claim 12 wherein said second wait period is different than said first wait period.

14. The method as recited in claim 8 wherein said first wait period is specified in a reply to said first buffer request.

15. An apparatus comprising:
    an inbound memory adapted to store data packets to be forwarded to an outbound memory, said data packets to be forwarded according to an order; and
    a processor coupled to the inbound memory and which generates a first resource request corresponding to a data packet stored in said inbound memory and not first in said order, said processor also adapted to delay generating a subsequent resource request for said data packet for a specified time period, wherein said processor also generates a second resource request for said data packet before said specified time period is due to expire upon said data packet becoming first in said order.

16. The apparatus of claim 15 wherein said processor sets said specified time period to zero when said data packet transitions to first in said order.

17. The apparatus of claim 15 wherein said processor manages said order of forwarding.

18. The apparatus of claim 15 wherein said specified time period is set to zero in response to said data packet transitioning to first in said order.

19. The apparatus of claim 15 wherein said second resource request is generated in response to said data packet transitioning to first in said order.

20. The apparatus of claim 15 wherein said specified time period is provided in a response to said first resource request.

21. The apparatus of claim 15 wherein said processor generates a resource request for said data packet when said specified time period expires.

* * * * *